US008417765B2

(12) United States Patent
Bittles et al.

(10) Patent No.: US 8,417,765 B2
(45) Date of Patent: Apr. 9, 2013

(54) METHOD AND APPARATUS TO ENABLE PROTOCOL VERIFICATION

(75) Inventors: William Bittles, Winchester (GB); Jason C. Edmeades, Chandlers Ford (GB); Simon R. Gormley, Peebles (GB); John B. Pickering, Winchester (GB); Paul A. Titheridge, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 761 days.

(21) Appl. No.: 12/481,079

(22) Filed: Jun. 9, 2009

(65) Prior Publication Data

US 2010/0312827 A1    Dec. 9, 2010

(51) Int. Cl.
*G06F 15/16* (2006.01)

(52) U.S. Cl.
USPC .......................................................... 709/203

(58) Field of Classification Search .................... 709/203
See application file for complete search history.

(56) References Cited

U.S. PATENT DOCUMENTS

| | | | |
|---|---|---|---|
| 5,347,524 A | 9/1994 | I'Anson et al. | |
| 5,349,642 A * | 9/1994 | Kingdon | 713/161 |
| 6,016,515 A * | 1/2000 | Shaw et al. | 719/321 |
| 6,473,406 B1 * | 10/2002 | Coile et al. | 370/248 |
| 6,684,271 B1 * | 1/2004 | Dahlgren | 710/38 |
| 7,313,613 B1 * | 12/2007 | Brooking et al. | 709/223 |
| 2002/0010761 A1 * | 1/2002 | Carneal et al. | 709/219 |
| 2002/0124187 A1 * | 9/2002 | Lyle et al. | 713/201 |
| 2004/0114922 A1 * | 6/2004 | Hardee | 398/17 |
| 2004/0139185 A1 * | 7/2004 | Souflis | 709/223 |
| 2005/0108322 A1 * | 5/2005 | Kline et al. | 709/203 |
| 2005/0177629 A1 * | 8/2005 | Betge-Brezetz et al. | 709/223 |
| 2007/0016939 A1 * | 1/2007 | Leibovitz et al. | 726/3 |
| 2007/0025259 A1 * | 2/2007 | Reinhold | 370/241 |
| 2007/0237179 A1 * | 10/2007 | Sethi | 370/469 |
| 2007/0239645 A1 * | 10/2007 | Du et al. | 706/45 |
| 2007/0250671 A1 * | 10/2007 | Lyon | 711/162 |
| 2008/0052561 A1 * | 2/2008 | Hopkins et al. | 714/39 |
| 2008/0320153 A1 * | 12/2008 | Douville et al. | 709/229 |
| 2009/0106381 A1 * | 4/2009 | Kasriel et al. | 709/206 |
| 2009/0204701 A1 * | 8/2009 | Herzog et al. | 709/224 |
| 2009/0228606 A1 * | 9/2009 | McCarthy et al. | 709/248 |
| 2010/0191856 A1 * | 7/2010 | Gupta et al. | 709/228 |
| 2010/0241807 A1 * | 9/2010 | Wu et al. | 711/118 |
| 2012/0102214 A1 * | 4/2012 | Pelton et al. | 709/230 |

FOREIGN PATENT DOCUMENTS

JP         06-250945         9/2004

* cited by examiner

*Primary Examiner* — Imad Hussain
(74) *Attorney, Agent, or Firm* — Scully, Scott, Murphy & Presser, P.C.; Jeanine S. Ray-Yarletts

(57) ABSTRACT

After a client device issues a request, a verification stub component receives the request. Then, the verification stub component obtains a current state of the client device from a client state table. The verification stub component evaluates whether the request is valid or not by analyzing a content and context of the request and checking the request against a protocol matrix. If the request is valid, the verification stub component updates the current state of the client device in the current state table, and forwards the request to a server device. Otherwise, the verification stub component creates a report describing the request is invalid, and evaluates whether the server can process the request. If the server cannot process the request, the verification stub component interrupts the request and forwards the report to the client device. Otherwise, the verification stub component provides the request to the server device.

25 Claims, 6 Drawing Sheets

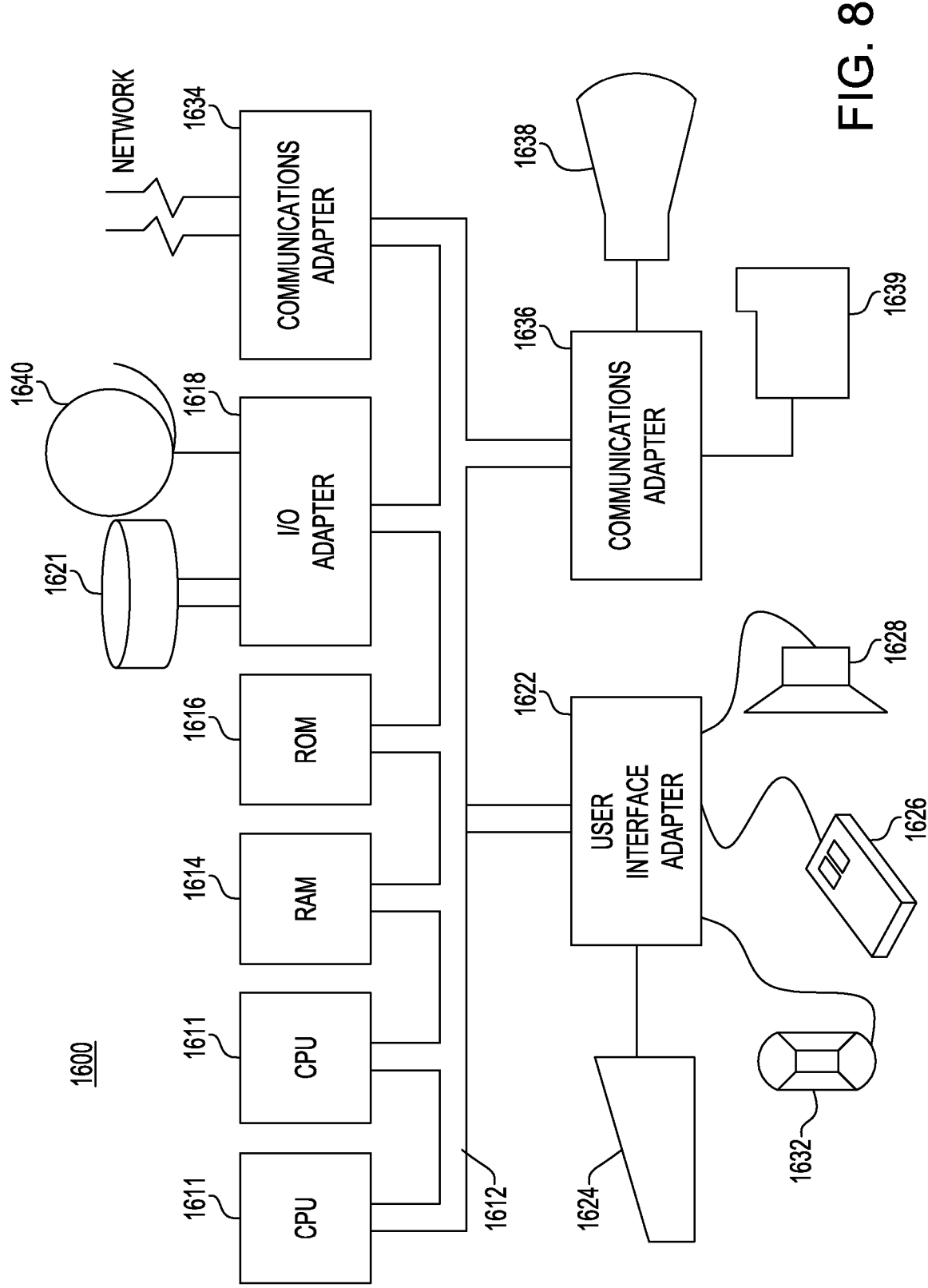

METHOD AND APPARATUS TO ENABLE PROTOCOL VERIFICATION

BACKGROUND

The present invention relates generally to a communication between a client device and a server device in a client-server environment, and more particularly to protocol verification in a client-server environment.

A client-server environment refers to a computing model which differentiates client devices (e.g., a laptop or desktop executing a web browser such as Microsoft® Internet Explorer®) from a server device (a laptop or desktop executing a server application such as Apache HTTP server), which communicate each other over a computer network (e.g., LAN or wireless LAN). A client device makes a service request to a server device. Upon receiving the request, the server device performs an operation corresponding to the request to the client device. For example, a web browser in a client device accesses information embodied in a faun of a web page from a web server. Emails and database access are also based on the client-server environment.

In the client-server environment, a client device and a server device communicate with each other by using sessions and protocols such as X/open XA and JMS (Java® Message Service). X/open XA is a standard specified by The Open Group for distributed transaction processing (DTP). A goal of X/open XA is to allow multiple resources (e.g., database, application servers, message queue, etc.) to be accessed within a same transaction while preserving ACID (Atomicity, Consistency, Isolation, Durability) properties across applications. JMS is a messaging standard that allows applications based on Java® to create, send, receive and read messages. JMS enables distributed communication that is loosely coupled, reliable and asynchronous.

These current technologies such as X/open XA and JMS are protocols because they require that actions between a client device and a server device are executed in a strictly predefined sequence. For example, a request Open_channel can only be followed by a response ACK (Acknowledgement). Thus, the strictly predefined sequence determines which action can be executed next. However, in a multi-threaded system where such sessions are shared between threads, errors can be introduced that violate such protocols when issuing a command out of sequence or closing a communication session that is being used by another client device. Such errors may first be shown in a different component other than where those errors occurred, e.g., a server device displays an error, which has been caused by a client device. This (i.e., detecting an error later in a different component) can increase error diagnosis time.

Thus, it is desirable to provide a system and method that identifies an error in a protocol immediately at a source of the error (i.e., at a device where the error occurred) and that immediately provides an error notification to the source.

BRIEF SUMMARY

The present invention allows protocol execution errors at a device to be identified at the time of occurrence at the device. This is obtained by analyzing a content and context of each request. As a client device issues a request, a component in the client device or a server device accesses and searches a table that details which requests are valid with respect to a current state of the client device. A learning function can be provided that uses historical data to predict whether a request is valid for a specific client device.

According to one embodiment of the present invention, there is provide a computer-implemented method for communicating a request between a first computing device and a second computing device in a client-server environment, the method comprising:
 receiving the request from the first computing device;
 obtaining a current state of the first computing device;
 evaluating whether the request is valid at the current state; and
 updating the current state of the first computing device and providing the request to the second computing device, if the request is valid.

According to a further embodiment, wherein the step of evaluating comprises:
 analyzing a content of the request;
 analyzing a context of the request;
 providing, at the first computing device or second computing device, a table describing all possible operations at the current state of the first computing device according to one or more pre-determined protocols; and
 checking the analyzed content and context of the request against the table.

According to a further embodiment, the method further comprises:
 obtaining historical data in the client-server environment, the historical data representing previous operations which have occurred between the first computing device and the second computing device; and
 predicting whether the request is valid or not based on the historical data.

According to another embodiment of the present invention, there is provided a system for communicating a request between a first computing device and a second computing device in a client-server environment, the system comprising:
 means for receiving the request from the first computing device;
 means for obtaining a current state of the first computing device;
 means for evaluating whether the request is valid at the current state; and
 means for updating the current state of the first computing device and providing the request to the second computing device, if the request is valid.

According to a further embodiment, wherein the means for evaluating comprises:
 means for analyzing a content of the request;
 means for analyzing a context of the request;
 means for providing, at the first computing device or the second computing device, a table describing all possible operations at the current state of the first computing device according to one or more pre-determined protocols; and
 means for checking the analyzed content and context of the request against the table.

According to a further embodiment, the system further comprises:
 means for selectively or partially enabling the table according to the analyzed content and context of the request.

According to a further embodiment, the system further comprises:
 means for selectively or partially disabling the table according to the analyzed content and context of the request.

BRIEF DESCRIPTION OF SEVERAL VIEWS OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

FIG. 8 illustrates an exemplary hardware configuration according to one embodiment of the present invention.

DETAILED DESCRIPTION

Figure 1:
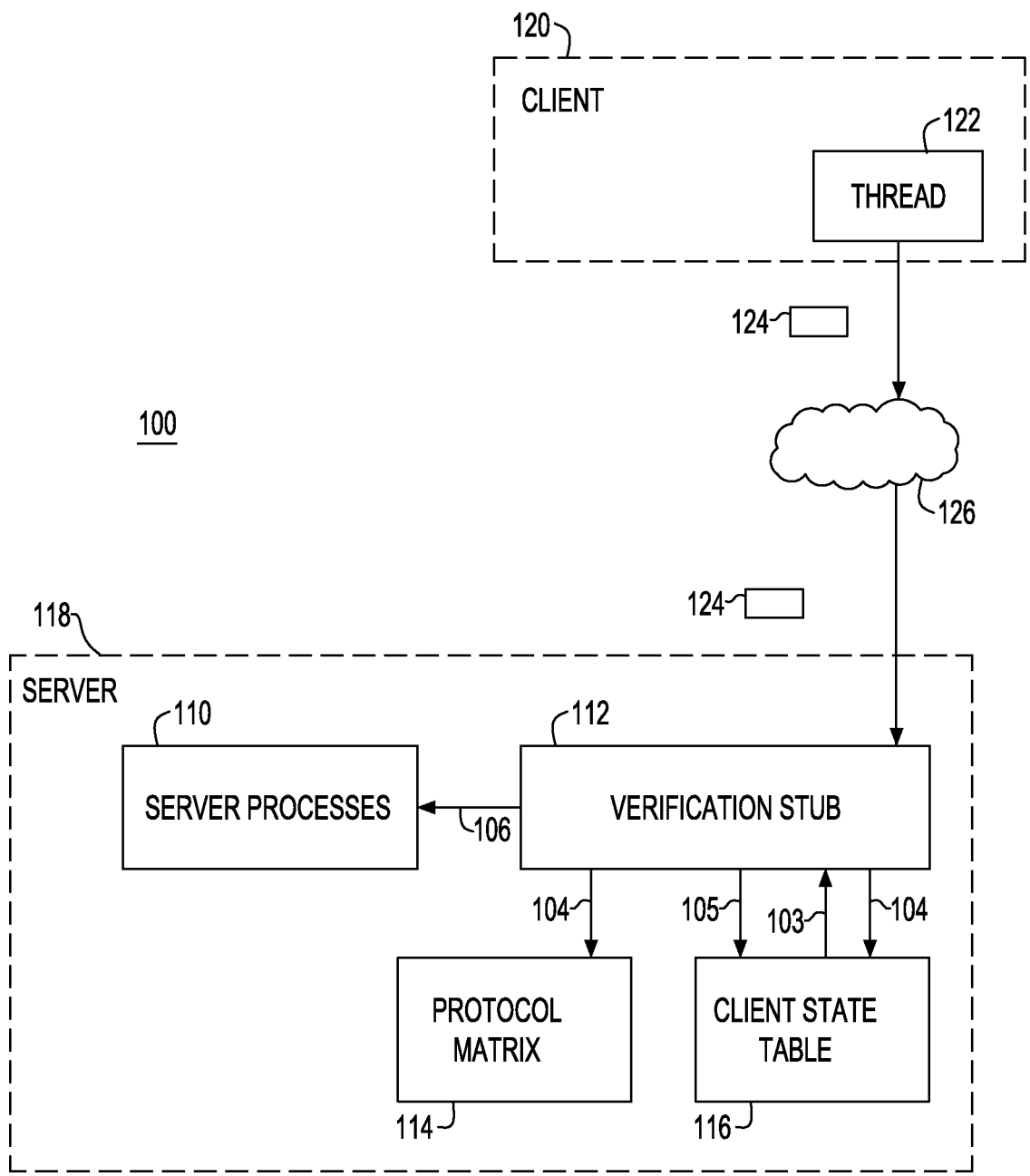
FIG. 1 illustrates a configuration of components in a client-server environment according to one embodiment of the present invention.

FIG. 1 illustrates a system diagram depicting a configuration of components according to one embodiment of the present invention. In a client-server environment 100, there are a plurality of client devices such as a client device 120. A client device is a computing device (e.g., a laptop, desktop, workstation and netbook) which includes a web browser such as Microsoft® Internet Explorer. The client-server environment also includes a plurality of server devices such as a server device 118. A server device is also a computing device such as a laptop, desktop, workstation and netbook which executes a server application (e.g., Apache HTTP Server application).

The client device 120 may execute multiple threads such as a thread 122. The thread 122 or the client device 120 issues a request 124 (e.g., a network message) to the server device 118, e.g., over a network 126 (e.g., Internet, Intranet, LAN (Local Area Network), wireless LAN, etc.). The network message refers to any electronic message sent over a network between a server device and a client device to perform a specific operation according to a protocol (i.e., a set of actions executed in a sequence; e.g., X/open XA, JMS, etc.). For example, if a client device wants to open a connection with a server device, the client device would send an "open_channel" message (i.e., a message requesting to open a communication channel between the client device and the server device) over the network. Then, the server device operates based on the message, and sends a reply message to the client device over the network. The reply message may include, but is not limited to, an "ACK" message (i.e., an acknowledgement message indicating the server device received the "open_channel" message from the client device) and an "RST" message (i.e., a reset message indicating that the server device has terminated the connection with the client device).

After the client device 120 issues the request 124 to the server device 118, a verification stub component 112, which may reside in each client device and/or each server device, receives the request 124. The verification stub component 112 is a component which provides a representation of a protocol to a client or server device. The verification stub component 112 may intercept requests issued by that client device, and verify whether the requests are valid according to the protocol. The verification stub component 112 may be implemented as software (e.g., by using programming languages such as C#, C++, Java®, .Net, etc.), hardware (e.g., by using ASIC (Application Specific Integrated Circuit) design methodology) or a combination of them (e.g., by using a computer including a memory and a processor).

After receiving the request 124 issued from the client device 120, the verification stub component 112 accesses 102 a client state table 116 to query about a current state of the client device 120 which issued the request 124. The client state table 116 may be in each client device and/or each server device. The client state table 116 in each client device describes a current state of the client device (e.g., a last valid request issued from the client device). The client state table 116 in each server device describes a current state of each client device (e.g., a last valid request issued from each client device) connected or communicating with the server device. The client state table 116 may be implemented in a database such as Oracle® and IBM® DB® 2.

Figure 4:
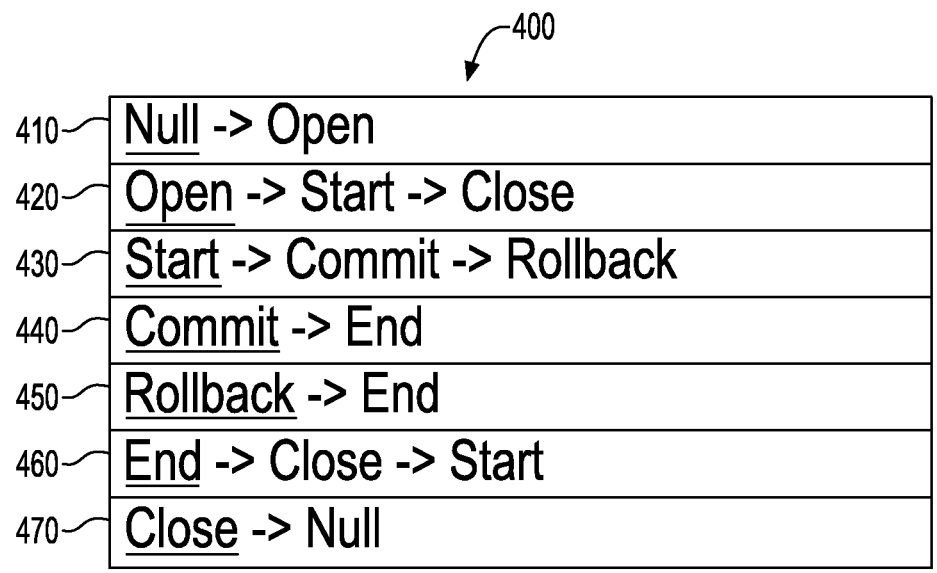
FIG. 4 illustrates an exemplary protocol matrix according to one embodiment of the present invention.

Upon receiving the query, the client state table 116 provides 103 the current state of the client device 120 to the verification stub component 112. Then, the verification stub component 112 evaluates whether the request 124 is valid given the current state of the client device 120. Alternatively, the verification stub component 112 evaluates whether the request 124 is valid given a current state of the server device 118 (i.e., a last valid response issued from the server device). In a further embodiment, to evaluate whether the request 124 is valid or not, the verification stub component 112 analyzes a content of the request 124. By analyzing a content of a request, the verification stub component 112 obtains, but is not limited to: a type of an operation (e.g., opens a communication channel, close a communication channel, etc.) that the request is associated with. In a further embodiment, to evaluate whether the request 124 is valid or not, the verification stub component 112 analyzes a context of the request 124. By analyzing a context of a request, the verification stub component 112 obtains, but is not limited to, a current state of the client device without accessing the current state table 116. In a further embodiment, to evaluate whether the request 124 is valid or not, the verification stub component 112 checks 104 the request 124 against a protocol matrix 114. The protocol matrix 114, which may be implemented as a data structure such as an array, vector, list or table, provides information describing all possible operations at the current state of the client device 120. A table 400 illustrated in FIG. 4 is an example of the protocol matrix 114.

Based on the evaluation, the verification stub component 112 updates 105 the client state table 116 according to the request 124. For example, if the request 124 is valid, the verification stub component 112 updates the client state table 116 to designate the request 124 as the current state of the client device 120. Otherwise, the verification stub component 112 does not update the client state table 116, e.g., by ignoring the request 124. In a further embodiment, if the request is valid, the verification stub component 112 forwards 106 the request 124 to processes 110 executed in the server device 118. The server processes 110 refers to instances of computer programs that are being sequentially or concurrently executed by the server device 118 that has an ability to run multiple computer programs sequentially or concurrently. Upon receiving the (valid) request 124, the server processes 110 may perfolin an operation (e.g., open a communication channel, etc.) described in the (valid) request 124.

Figure 2:
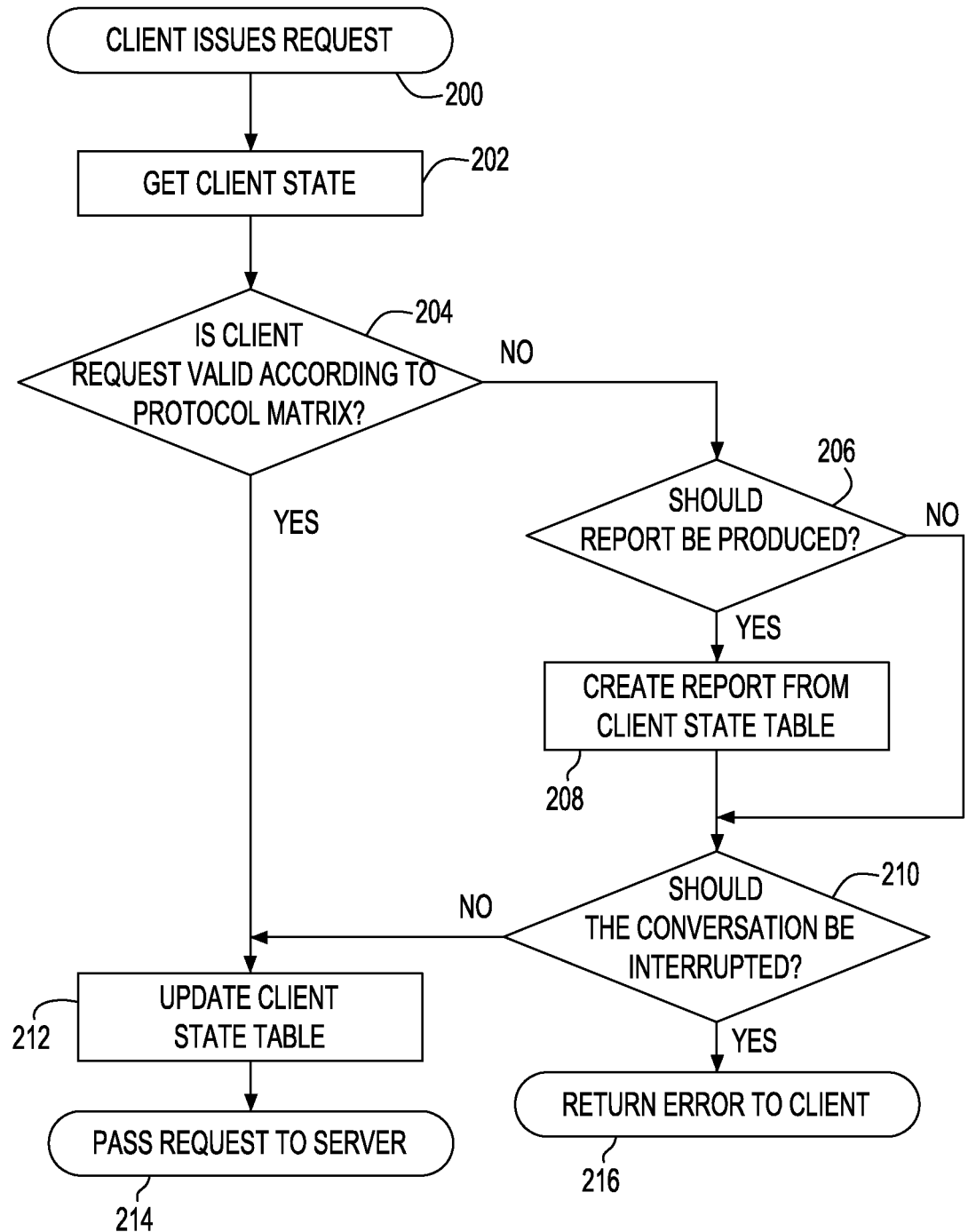
FIG. 2 illustrates a flow chart describing method steps executed according to one embodiment of the present invention.

FIG. 2 illustrates a flow chart describing method steps executed by the verification stub component 112 according to one embodiment of the present invention. At step 200, a client device 120 issues a request 124. Once the client device 120 issues the request 124, at step 202, the verification stub component 112, which may reside in the client device 120 or a server device 118, accesses a client state table 116 to obtain a current state of the client device 120. Alternatively, the client device 112 obtains the current state of the client device 120 by analyzing a context of the request 124. The client state table 116 may reside in each client device and/or each server device. At step 204, the verification stub component 112 evaluates whether the request 124 is valid according to the protocol matrix 114. The protocol matrix 114 describes all possible requests at the current state of the client device 120. Thus, if the request 124 matches with one of the possible requests, the verification stub component 112 considers the request 124 as a valid request. Otherwise, the verification stub component 112 considers the request 124 an invalid request.

If the request is invalid, at step 206, the verification stub component 112 evaluates whether a report needs to be produced. The report includes, but is not limited to: an exception stack trace (i.e., history of function calls until the request 124) and an entry in a RAS (Remote Access Service) file. The RAS file refers to a file that enables a combination of hardware and software to access to tools or information that resides on a network of IT (Information Technology) devices. In a further embodiment, the verification stub component 112 may produce the report every time the client device 120 issues an invalid request.

If the verification stub component 112 decides to produce the report, at step 208, the verification stub component 112 creates the report which further includes that the request 124 is invalid. Otherwise, the verification stub component 112 omits creating the report. Whether the report is created or not, at step 210, the verification stub component 112 evaluates whether the request 124 can be processed at the server device 118. In other words, even though the request 124 is invalid, if the server device 118 can accept and process the request 124, the verification stub component 112 forwards the request 124 to the server device 118. For example, a server device may be configured to accept or process all requests from a particular client device regardless of validity of requests. A server device may be configured to not accept or process any invalid request from any client device.

If the verification stub component 112 determines that the server device cannot accept or process the request 124, e.g. based on configuration information of each server device, at step 216, the verification stub component 112 interrupts the request 124 and sends an error message (e.g., a report generated at step 208) to the client device 120. Otherwise, at step 212, the verification stub component 112 updates the client state table 116, e.g., by designating the request 124 as the current state of the client device 120. At step 214, the verification stub component 112 provides the request 124 to the server device 118.

According to one embodiment of the present invention, the client state table 116 and the protocol matrix 114 allow a state of each client device to be tracked within a particular protocol. The verification stub component 112 evaluates whether a request is valid or not according to the state and the protocol. Thus, the verification stub component 112 operating in real-time allows errors in a protocol to be identified immediately (i.e., right after issuing a request) at the source (e.g., a client device issued the request which causes the errors). Thus, a verification stub component 112 recognizes or identifies the errors immediately after a client, where the verification stub component 112 resides, issues the requests that caused the errors. Thus, the verification stub component 112 helps diagnosing an error fast and easily. In an alternative embodiment, the server device 118 or the client device 120 recognizes the errors after receiving the report generated at step 206.

According to one embodiment of the present invention, the verification stub component 112 maintains the protocol matrix 114 that details which requests are valid with regard to a client device's progress (i.e., a client device's current state) through a protocol. As a client device issues a request or a command, the verification stub component 112 performs a look-up of the protocol matrix 114 and evaluates whether the request or command is valid according to the protocol.

According to an exemplary embodiment of the present invention, within X/open XA protocol, previously issued requests determine states of client devices that have issued the requests and thus affects what can be issued next. For example, an "open_channel" request issued from a client device can only be followed by a ACK response issued from a server device. The ACK response can only be followed by data packets or a "channel_closing" alert (i.e., an alert for closing a communication channel between the client device and the server device) issued from the client device or the server device. The verification stub component 112 records requests issued and other meta-data such as a function call stack (i.e., history of function calls). If a client device issues an invalid request, a verification stub component in the client device may issue a report (e.g., a report created at step 208 in FIG. 2). The verification stub component 112 may also validate that responses (e.g., Acknowledgement) from the server device 118 are expected responses according to the protocol.

According to one embodiment of the present invention, the verification stub component 112 includes the protocol matrix 114 (e.g., a table 400 in FIG. 4) which lists all possible requests or actions in a protocol. There may be a protocol matrix 114 per protocol. The verification stub component 112 enables or initiates (e.g., calls a function) valid requests without errors. The verification stub component 112 disables invalid requests that may cause protocol errors. If a client device issues an invalid request, the verification stub component 112 issues an error message.

As a server device processes a request, requests that may be valid as a next request may change. Thus, while the server device processes a request issued from a client device, the verification stub component 112 makes changes in the protocol matrix 114 to reflect a change in a current state of that client device. For example, the verification stub component 112 may disable or enable different portion of the protocol matrix at each different state of the client device. As the server device executes the request, response or acknowledgments from the server device can also affect which request may be valid to execute next. Possible requests or actions may also change to take into account results or responses of previous requests or actions.

The verification stub component 112 can accommodate a new protocol or a new version of an existing protocol, e.g., by dynamically updating the protocol matrix 114 (e.g., changing a row in table 400, adding a new table reflecting the new protocol, etc.) without changing the verification stub component 112 itself. In a further embodiment, the protocol matrix 114 includes rules which state which action or request can become active at a current state of a client device. The verification stub component 112 can enable a specific rule in the protocol matrix 114 according to the current state of the client device, and disable other rules.

Figure 3:
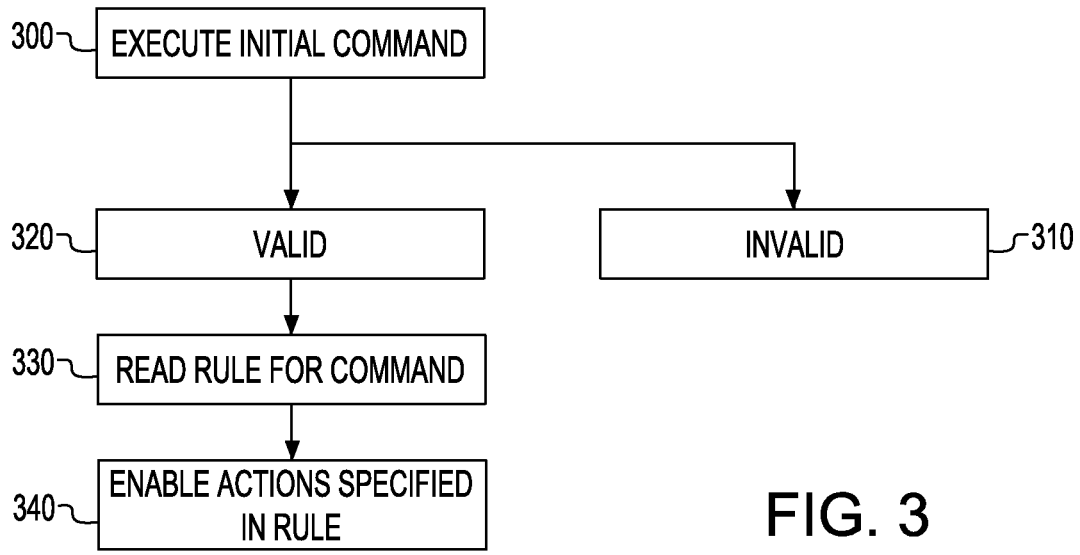
FIG. 3 illustrates a flow chart describing method steps executed in the verification stub component according to one embodiment of the present invention.

FIG. 3 illustrates a flow chart executed by the verification stub component 112 according to one embodiment of the present invention. In this non-limiting embodiment, the verification stub component 112 may reside in a server device 118. At step 300, the verification stub component 112 receives a request from a client device, and evaluates whether the request is valid or not against the protocol matrix 114. If the request was invalid, at step 310, the verification stub component 112 stops processing the request. Otherwise, at step 320, the verification stub component 112 access the protocol matrix 114 with the (valid) request. At step 330, the verification stub component 112 reads a corresponding rule for the request from the protocol matrix 114, e.g., by using the request as a key or index accessing the corresponding rule provided in the protocol matrix 114. For example, the protocol matrix 114 may describe a rule per row. The verification stub component 112 may access a specific row to obtain a specific rule, e.g., by using the request as a key or index. At step 340, the verification stub component 112 enables actions (e.g., opening or closing a communication channel, etc.) described in the corresponding rule. Then, the server device 118 executes the actions.

FIG. 4 illustrates an exemplary protocol matrix or like data structure according to one embodiment of the present invention. The protocol matrix 114 may be implemented as a table such as a table 400 in FIG. 4. The table 400 may include a plurality of rows. Each row in the table 400 describes valid request(s) or action(s) at each state of a client device according to an exemplary protocol such as JMS® or X/open XA. For example, the table 400 includes, but is not limited to: a first row 400 describing a valid request or action when a current state of a client device is "Null" (i.e., the last valid request issued from the client device is "Null"); a second row 420 describing a valid request or action when a current state of a client device is "Open" (i.e., the last valid request issued from the client device is "Open"); a third row 430 describing a valid request or action when a current state of a client device is "Start" (i.e., the last valid request issued from the client device is "Start"); a fourth row 440 describing a valid request or action when a current state of a client device is "Commit" (i.e., the last valid request issued from the client device is "Commit"); a fifth row 450 describing a valid request or action when a current state of a client device is "Rollback" (i.e., the last valid request issued from the client device is "Rollback"); a sixth row 460 describing a valid request or action when a current state of a client device is "End" (i.e., the last valid request issued from the client device is "End"); and a seventh row 470 describing a valid request or action when a current state of a client device is "Close" (i.e., the last valid request issued from the client device is "Close").

The "Null" request may refer to a request or an action doing nothing. The "Open" request may refer to a request or an action opening a communication channel. The "Start" request may refer to a request or an action starting a transaction between a client device issued the request and a server device received the request. The "Commit" request may refer to a request or an action confirming a change made during the transaction. The "Rollback" request may refer to a request or an action request canceling the change made during the transaction. The "End" request may refer to a request or an action ending the transaction. The "Close" request may refer to a request or an action closing the communication channel.

Based on the table 400, the verification stub component 112 evaluates whether a request is valid at a current state of a client device. For example, as described at the second row 420, if a current state of a client device is "Open", a valid request that the client device can issue is a "Start" request. If the client device issued a "Commit" request instead of the "Start" request, the verification stub component 112 considers the "Commit" request as an invalid request. The first row 410 describes that an "Open" request is valid and other requests are invalid when a current state of a client device is "Null". If a client device issues the "Open" request when the current state is "Null", the current state becomes "Open", which is described in the second row 420. When a current state of a client device is "Open", a valid request that the client device can issue is "Start", and other requests are invalid. Other rows 430-470 also describe valid and invalid requests or actions at each state as described in rows 410-420.

As described above, the verification stub component 112 analyzes a content and context of a request issued from a client device. For example, to analyze the content of the request, the verification stub component 112 matches the request for known identifiers that indicate a type of a request (e.g., whether the request is an "open_channel", "acknowledgement", etc.). To analyze the context of the request, the verification stub component 112 parses the content of the request, and checks whether the type of the request is valid for a current state of the client device. For example, if a client device operates according to an exemplary protocol illustrated in FIG. 4 and issues a "Close" request when a current state of the client device is "Rollback", then the verification stub component 112 considers the "Close" request as an invalid request. As illustrated in the fifth row 450 of the table 400, a valid request that can be issued when the current state of the client device is "Rollback" is an "End" request. Thus, the verification stub component 112 considers the "Close" request as an invalid request.

In a further embodiment, the verification stub component 112 selectively or partially enables or disables the protocol matrix 114 according to the analyzed content and context of the request. For example, when a current state of a client device is "Commit", i.e., a last valid request issued from the client device is the "Commit" request, the verification stub component 112 activates only the fourth row 440 of the table 400, and deactivates other rows.

In a further embodiment, the verification stub component 112 obtains historical data (e.g., a history of function calls), e.g., from a software stack (i.e., a set of programs that work together to produce a result; a group of applications that work in a sequence toward a common result). The historical data refers to data that represent all previous activities which have occurred from a pre-determined time between a client device and a server device. The verification stub component 112 predicts whether a request is valid or not based on the historical data.

Figure 5:
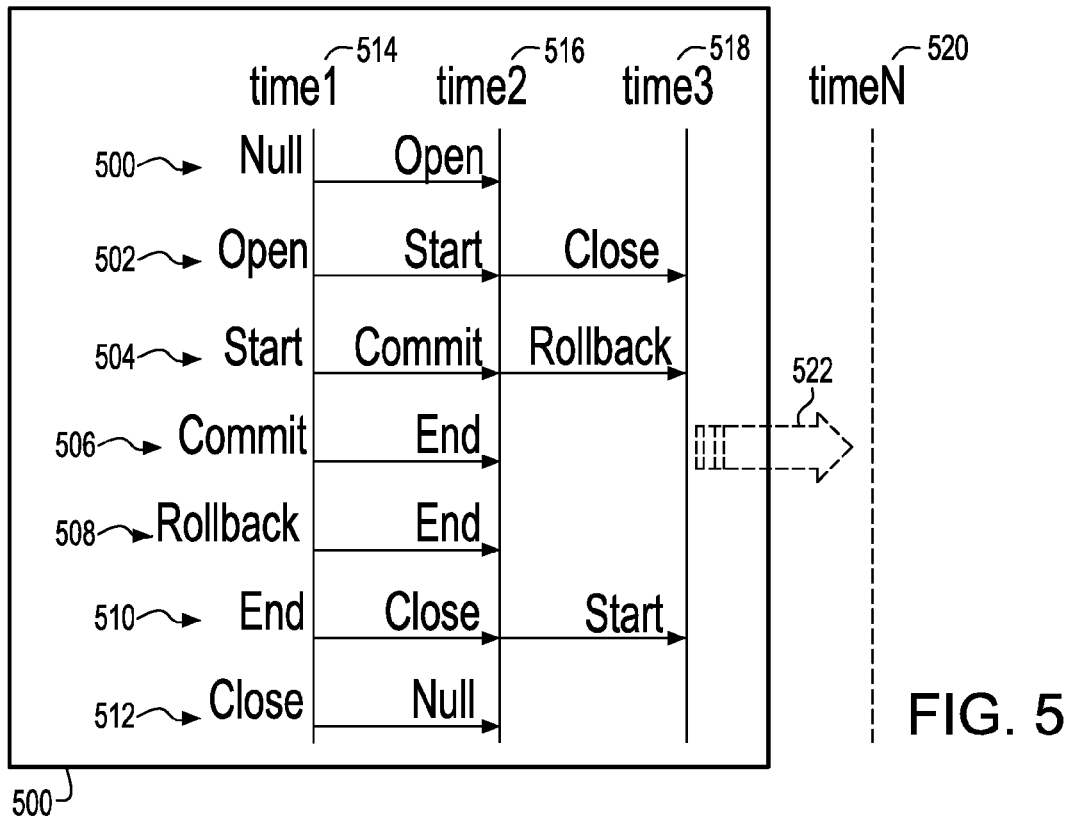
FIG. 5 illustrates predicting whether a request is valid or not based on historical data according to an exemplary embodiment of the present invention.
Figure 6:
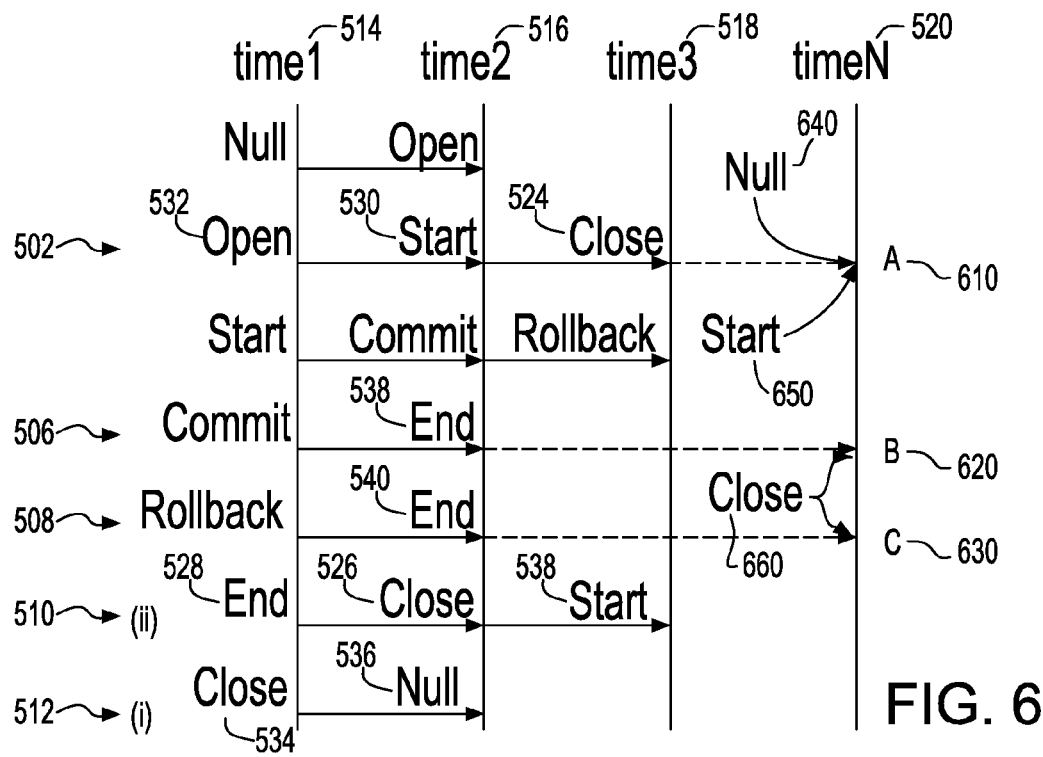
FIG. 6 illustrates predicting valid future requests according to an exemplary embodiment of the present invention.

FIGS. 5-6 illustrate an exemplary processing scenario for predicting whether a request is valid based on the historical data according to one embodiment of the present invention. FIG. 5 illustrates representing historical data according to states and transitions over time. In FIG. 5, each vertical line such as time 1 (514), time 2 (516) and time 3 (518) represents an arbitrary monitoring point (i.e., a time at which data are viewed or obtained) from the first monitoring point, time 1 (514), to a future predicting point (i.e., a time at which a prediction is made), time N (520). There may be an arbitrary interval between time 1 (514) and time 2 (516) and between time 2 (516) and time 3 (518). There may be another arbitrary interval between time 3 (518) and time N (520). Sequences of requests illustrated in the table 400 of FIG. 4 is shown as horizontal tracks across the time slices (e.g., time 1 (514), time 2 (516), time 3 (518)). For example, the first row 410 of the table 400 corresponds to a first horizontal track 500. Based on the first track 500, a client device issued a "Null" request at time 1 (514), and issued an "Open" request at time 2 (516). The second row 420 of the table 400 corresponds to a second horizontal track 502. Based on the second track, a client device issued an "Open" request at time 1 (514), a "Start" request at time 2 (516) and a "Close" request at time 3 (518). Similarly, the third row 430 of the table 400 corresponds to the third horizontal track 504. The fourth row 440 of the table 400 corresponds to the fourth horizontal track 506. The fifth row 450 of the table 400 corresponds to the fifth horizontal track 508. The sixth row 460 of the table 400 corresponds to the sixth horizontal track 510. The seventh row 470 of the table 400 corresponds to the seventh horizontal track 512. As described above, each horizontal track describes a sequence of previous valid requests issued from each client device. The verification stub component 112 utilizes the sequences of previous valid requests to predict 522 a valid request at time N (520).

FIG. 6 illustrates an example of how to use the historical data to predict a valid future request according to one embodiment of the present invention. Based on the sequences of previous valid requests illustrated in FIG. 5, the verification stub component 112 predicts a request that is expected at time N (520). For example, as illustrated at the second horizontal track 502 in FIG. 6, a client device issued an "Open" request 532 at time 1 (514), a "Start" request 530 at time 2 (516) and a "Close" request 524 at time 3 (518). Because the client device issued the "Close" request 524 at time 3 (518), the verification stub component 112 predicts that a next request may be a "Null" request 640 at the point A (610) based on the seventh horizontal track (i) 512 shown in FIG. 6. The horizontal track (i) 512 illustrates that a "Null" request 536 was issued right after a "Close" request 534 was issued. Thus, the verification stub component 112 predicts the "Null" request 640 at the point A (610) after the "Close" request 524 issued at time 3 (518). However, based on the sixth horizontal track (ii) 510, the verification stub component 112 predicts a "Start" request 650 at the point A (610). The horizontal track (ii) 510 illustrates that a "Start" request 538 was issued right after a "Close" request 526 was issued. Thus, the verification stub component 112 predicts that the "Start" request 650 at the point A after a "Close" request 524 at time 3 (518). Similarly, based on the horizontal track (ii) 510, the verification stub component 112 predicts that a "Close" request 660 at a point B (620) and at a point C (630). The horizontal track (ii) 510 illustrates that a "Close" request 526 was issued right after a "End" request 528 was issued. Thus, the verification stub component 112 predicts that there may be the "Close" request 660 at the point B (620) after an "End" request 538 at the fourth horizontal track 506, and that there may be the "Close" request 660 at the point C (630) after an "End" request 540 at the fifth horizontal track 508.

Based on the prediction illustrated in FIGS. 5-6, the verification stub component 112 can predict a valid future request when receiving a current valid request. Thus, the verification stub component 112 can configure a server device to process the valid future request right after processing the current valid request before actually receiving the valid future request. Therefore, client devices can have faster responses from server devices, and overall throughput of the server devices can increase.

Figure 7:
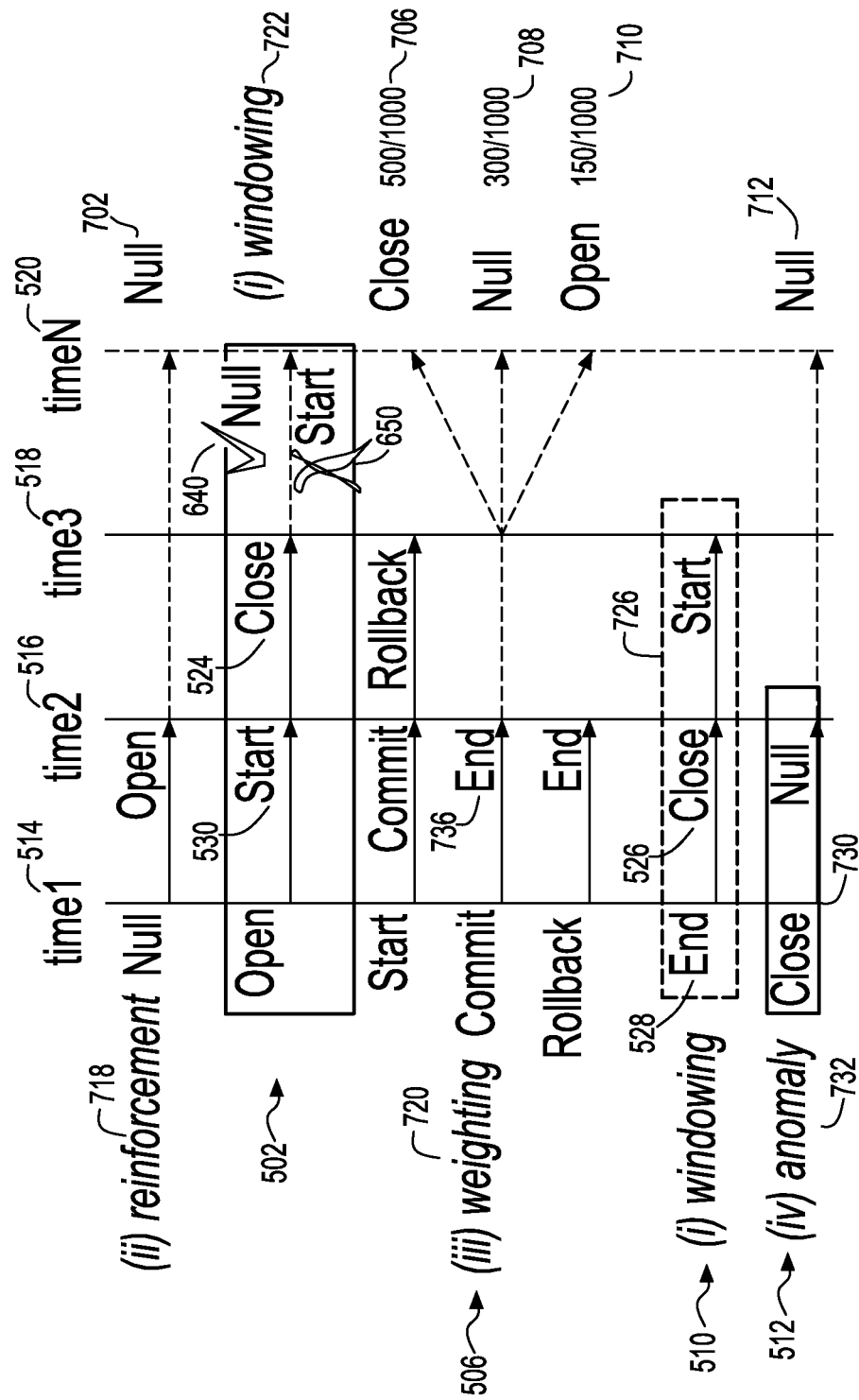
FIG. 7 illustrates utilizing a "windowing" scheme and probability when predicting a valid request according to one embodiment of the present invention.

In a further embodiment, the verification stub component 112 utilizes a "windowing" scheme to disambiguate between the "Null" request 640 and the "Start" request 650 at the point A 610. The verification stub component 112 utilizes probability obtained from historical data to assure that there is the "Close" request 660 at the points B (620) and C (630). FIG. 7 illustrates the "windowing" scheme and employing probability according to this embodiment. To disambiguate between the "Null" request 640 and the "Start" request 650, the verification stub component 112 applies "windowing" 722 (e.g., a window 726) on previous valid requests. In other words, the prediction made in FIG. 6 is based on matching one request (e.g., matching the "Close" request 524 at the second horizontal track 502 with the "Close" request 526 at the sixth horizontal track 510).

On the other hand, in the "windowing" scheme 722, the verification stub component 112 obtains a series of previous valid requests (e.g., requests issued at time 1 (514) and time 2 (516)) associated with a request (e.g., a "Start" request 650), e.g., from a software stack. Then, the verification stub component 112 evaluates whether the series of the previous valid requests (e.g., previous requests in the window 726) is matched with a series of requests prior to the request (e.g., prior requests in a window 728). If there is no match, the verification stub component 112 invalidates the request. Otherwise, the verification stub component 112 validates the request. For example, to predict whether a "Start" request 650 is a valid request at time N (520), the verification stub component 112 obtains a series of previous valid requests (e.g., requests in the window 726) from the sixth horizontal track 510 from which the "Start" request 650 is predicted. Then, the verification stub component 112 evaluates whether the series of previous valid requests in the window 726 is matched with a series of prior requests in the window 728. Specifically, the verification stub component 112 found that the "Close" request 526 is matched with the "Close" request 524. However, the verification stub component 112 found that the "End" request 528 is not matched with the "Start" request 530. Therefore, the verification stub component 112 determines that the "Start" request 650 is not a valid request, because the previous requests in the window 726 do not match with the prior requests in the window 728. However, the verification stub component 112 validates the "Null" request 640, because previous requests in the window 730 match with the prior requests in the window 728.

In a further embodiment, the verification stub component 112 can predict or compute every possibility or probability of every possible request at a current state of a client device. In this embodiment, the verification stub component 112 adopts a weighting scheme 720 (i.e., a scheme assigning a likelihood of each possible request based on the historical data). For example, after 1,000 iterations (i.e., after obtaining 1,000 sequences of previous valid requests), the verification stub component 112 may find that a series or sequence of a "Commit" request 734 and a "End" request 736 described in the fourth horizontal track 506 met a "Close" request 706 issued right after the "End" request 736 for 500 times, a "Null" request 708 issued right after the "End" request 736 for 300 times and a "Open" request issued right after the "End" request 736 for 150 times. Then, the verification stub component 112 predicts that the client device may issue the "Close" request 706 after the series or sequence with, for example, 50% possibility (500/1,000), issue the "Null" request 708 after the series or sequence with, for example, 30% possibility ($^{300}/_{1,000}$), and issue the "Open" request 710 after the series or sequence with, for example, 15% possibility ($^{150}/_{1,000}$). Though FIG. 7 considers the 1,000 iterations, the number of iterations (i.e., the number of sequences of previous requests) may be an order of 100,000. As more iterations, the verification stub component 112 obtains more stable and reliable probability of each possible request.

In a further embodiment, the verification stub component 112 assesses a likelihood of validity of a series of requests that just issued based on the historical data. The verification stub component 112 assesses a likelihood of invalidity of a series of requests that just issued based on the historical data. For example, if the verification stub component 112 finds typical or popular invalid series of requests from the iterations, the verification stub component 112 can assess a likelihood of future invalid sequences. Similarly, if the verification stub component 112 finds typical or popular valid series of requests from the iterations, the verification stub component 112 can assess a likelihood of future valid sequences.

In a further embodiment, as obtaining more sequences of previous valid requests, the verification stub component 112 may reinforce 718 certain sequences, or reduce their statistical likelihood. For example, after the 1,000 iterations, the verification stub component 112 may obtain 50% possibility of a "Null" request 702. However, after 1,000 more iterations, the verification stub component 112 may obtain, for example, 75% possibility of the "Null" request 702.

In a further embodiment, as a result of obtaining more sequences of previous valid requests, the verification stub component 112 can identify an anomaly 732 in sequences of requests with greater confidence. For example, with the 1,000 iterations, the verification stub component 112 obtains 0.1% possibility of a "Null" request 712. However, with 1,000 more iterations, the verification stub component obtains, for example, 0.05% possibility of the "Null" request 712.

In one embodiment, the verification stub component 112 executing method steps in FIGS. 2-3 are implemented in hardware or reconfigurable hardware, e.g., FPGA (Field Programmable Gate Array) or CPLD (Complex Programmable Logic Device), using a hardware description language (e.g., Verilog, VHDL, Handel-C, or System C). In another embodiment, the verification stub component 112 is implemented in a semiconductor chip, e.g., ASIC (Application-Specific Integrated Circuit), using a semi-custom design methodology, i.e., designing a chip using standard cells and a hardware description language. Thus, the hardware, reconfigurable hardware or the semiconductor chip executes the method steps described in FIGS. 2-3.

In another embodiment, the verification stub component 112 is implemented in a computing device (e.g., a computing device 1600 in FIG. 8) that includes at least one processor and at least one memory. FIG. 8 illustrates an exemplary hardware configuration of the computing device 1600 executing and/or implementing the method steps in FIGS. 2-3. The hardware configuration preferably has at least one processor or central processing unit (CPU) 1611. The CPUs 1611 are interconnected via a system bus 1612 to a random access memory (RAM) 1614, read-only memory (ROM) 1616, input/output (I/O) adapter 1618 (for connecting peripheral devices such as disk units 1621 and tape drives 1640 to the bus 1612), user interface adapter 1622 (for connecting a keyboard 1624, mouse 1626, speaker 1628, microphone 1632, and/or other user interface device to the bus 1612), a communication adapter 1634 for connecting the system 1600 to a data processing network, the Internet, an Intranet, a personal area network (PAN), etc., and a display adapter 1636 for connecting the bus 1612 to a display device 1638 and/or printer 1639 (e.g., a digital printer of the like).

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, .Net, Binary code) executed by a processor (e.g., Intel® Core™, IBM PowerPC®) for causing a computer to perform method steps of this invention. The present invention may include a method of deploying a computer program product including a program of instructions in a computer readable medium for one or more functions of this invention, wherein, when the program of instructions is executed by a processor, the compute program product performs the one or more of functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer-implemented method for communicating a current request between a first computing device and a second computing device in a client-server environment, the method comprising:
   receiving, at the second computing device, the current request from the first computing device;
   determining, at the second computing device, whether the first computing device is a client device for which the second computing device is configured to process requests from;
   obtaining a current state of the first computing device if the first computing device is not the client device;
   evaluating whether the current request is valid at the current state if the first computing device is not the client device;
   updating the current state of the first computing device, if the current request is valid and if the first computing device is not the client device;
   processing, at the second computing device, the current request, if the current request is valid and if the first computing device is not the client device;
   predicting a future valid request based on the current request, if the current request is valid and if the first computing device is not the client device;
   configuring the second computing device to process the future valid request before actually receiving the future valid request, if the current request is valid and if the first computing device is not the client device, whereby the configuring reduces a response time from the second computing device and an overall throughput of the second computing device increases; and
   processing, at the second computing device, all requests from the first computing device regardless of validity of all the requests if the first computing device is the client device.

2. The computer-implemented method according to claim 1, wherein if the current request is evaluated as invalid and if the first computing device is not the client device, the method further comprises:
   creating a report describing that the current request is invalid and evaluating whether the current request can be processed at the second computing device;
   interrupting the current request and sending an error message to the first computing device, if the current request cannot be processed at the second computing device; and
   providing the current request to the second computing device, otherwise.

3. The computer-implemented method according to claim 1, wherein the step of evaluating comprises:
   analyzing a content of the current request;
   analyzing a context of the current request;
   providing, at the first computing device or second computing device, a table describing all possible operations at the current state of the first computing device according to one or more pre-determined protocols; and
   checking the analyzed content and context of the current request against the table.

4. The computer-implemented method according to claim 3, further comprising:
   selectively or partially enabling the table according to the analyzed content and context of the current request.

5. The computer-implemented method according to claim 3, further comprising:
   selectively or partially disabling the table according to the analyzed content and context of the current request.

6. The computer-implemented method according to claim 3, further comprising:
   dynamically changing the table to allow different protocols and different versions of protocols in the client-server environment.

7. The computer-implemented method according to claim 1, wherein the current request is a network message, the first computing device is a client device, and the second computing device is a server device.

8. The computer-implemented method according to claim 1, further comprising:
   obtaining historical data in the client-server environment, the historical data representing previous operations which have occurred between the first computing device and the second computing device; and
   predicting whether a further request is valid or not based on the historical data.

9. The computer-implemented method according to claim 8, the step of predicting comprises:
   obtaining a series of previous requests associated with the further request from the historical data;
   evaluating whether the series of the previous requests is matched with a series of requests prior to the further request;
   invalidating the further request, if there is no match; and
   validating the further request, otherwise.

10. The computer-implemented method according to claim 8, further comprising:
    predicting possibilities of all possible requests at the current state based on the historical data.

11. The computer-implemented method according to claim 10, further comprising:
    assessing a likelihood of validity of a series of requests that just issued based on the historical data; and
    assessing a likelihood of invalidity of a series of requests that just issued based on the historical data.

12. The computer-implemented method according to claim 1, wherein the steps of receiving, obtaining, evaluating and updating are performed by a component residing in the first computing device or the second computing device.

13. A non-transitory computer readable medium embodying computer program instructions being executed by a processor for causing a computer to perform method steps for communicating a request between a first computing device and a second computing device in a client-server environment, said method steps comprising the steps of claim 1.

14. A method of deploying a computer program product including programs of instructions in a computer readable medium for communicating a request between a first computing device and a second computing device in a client-server environment, wherein, when the programs of instructions are executed by at least one processor, the computer program product performs the steps of claim 1.

15. A system for communicating a current request between a first computing device and a second computing device in a client-server environment, the system comprising:
    at least one memory device;
    at least one processor coupled to the at least one memory device, wherein the at least one processor is further configured to perform steps of:
    receiving, at the second computing device, the current request from the first computing device;

determining, at the second computing device, whether the first computing device is a client device for which the second computing device is configured to process requests from;

obtaining a current state of the first computing device if the first computing device is not the client device;

evaluating whether the current request is valid at the current state if the first computing device is not the client device;

updating the current state of the first computing device, if the request is valid and if the first computing device is not the client device;

processing, at the second computing device, the current request, if the current request is valid and if the first computing device is not the client device;

predicting a future valid request based on the current request, if the current request is valid and if the first computing device is not the client device;

configuring the second computing device to process the future valid request before actually receiving the future valid request, if the current request is valid and if the first computing device is not the client device, whereby the configuring reduces a response time from the second computing device and an overall throughput of the second computing device increases;

processing, at the second computing device, all requests from the first computing device regardless of validity of all the requests if the first computing device is the client device.

16. The system according to claim 15, wherein if the request is evaluated as invalid and if the first computing device is not the client device, the processor is further configured to perform steps of:

creating a report describing that the current request is invalid and evaluating whether the current request can be processed at the second computing device;

interrupting the current request and sending an error message to the first computing device, if the current request cannot be processed at the second computing device; and providing the current request to the second computing device, otherwise.

17. The system according to claim 15, wherein in order to perform the evaluating the processor is further configured to perform steps of:

analyzing a content of the current request;

analyzing a context of the current request;

providing, at the first computing device or the second computing device, a table describing all possible operations at the current state of the first computing device according to one or more pre-determined protocols; and checking the analyzed content and context of the current request against the table.

18. The system according to claim 17, wherein the processor is further configured to perform a step of:

selectively or partially enabling the table according to the analyzed content and context of the current request.

19. The system according to claim 17, wherein the processor is further configured to perform a step of:

selectively or partially disabling the table according to the analyzed content and context of the current request.

20. The system according to claim 17, wherein the processor is further configured to perform a step of:

dynamically changing the table to allow different protocols and different versions of protocols in the client-server environment.

21. The system according to claim 15, wherein the current request is a network message, the first computing device is a client device, and the second computing device is a server device.

22. The system according to claim 15, wherein the processor is further configured to perform steps of:

obtaining historical data in the client-server environment, the historical data representing previous operations which have occurred between the first computing device and the second computing device; and predicting whether a further request is valid or not based on the historical data.

23. The system according to claim 22, wherein in order to perform the predicting, the processor is further configured to perform steps of:

obtaining a series of previous requests associated with the further request from the historical data;

evaluating whether the series of the previous requests is matched with a series of requests prior to the further request;

invalidating the further request, if there is no match; and validating the further request, otherwise.

24. The system according to claim 22, wherein the processor is further configured to perform steps of: predicting possibilities of all possible requests at the current state based on the historical data.

25. The system according to claim 24, wherein the processor is further configured to perform steps of:

assessing a likelihood of validity of a series of requests that just issued based on the historical data; and assessing a likelihood of invalidity of a series of requests that just issued based on the historical data.

* * * * *